United States Patent [19]

Maruyama et al.

[11] Patent Number: 4,695,910
[45] Date of Patent: Sep. 22, 1987

[54] RECORDING DISC CARTRIDGE HAVING AN IMPROVED HUB ASSEMBLY

[75] Inventors: Hiroshi Maruyama, Yuki; Kunio Mizushima, Toride; Akito Sakemoto, Tsukuba; Nobuhiro Umebayashi, Yuki, all of Japan

[73] Assignee: Hitachi Maxell, Ltd., Osaka, Japan

[21] Appl. No.: 636,377

[22] Filed: Jul. 31, 1984

[30] Foreign Application Priority Data

Aug. 3, 1983 [JP] Japan ............... 58-142359

[51] Int. Cl.⁴ ............................... G11B 23/03
[52] U.S. Cl. ............................... 360/133
[58] Field of Search ............... 360/133; 206/444

[56] References Cited

U.S. PATENT DOCUMENTS

| | | | |
|---|---|---|---|
| 4,510,546 | 4/1985 | Asami et al. | 360/133 |
| 4,532,564 | 7/1985 | Larson et al. | 360/133 |
| 4,583,144 | 4/1986 | Kato | 360/133 |
| 4,590,532 | 5/1986 | Saito | 360/133 |

FOREIGN PATENT DOCUMENTS

| | | | |
|---|---|---|---|
| 83107645 | 2/1984 | European Pat. Off. | 360/133 |
| 2101390 | 1/1983 | United Kingdom | 360/133 |

*Primary Examiner*—Robert S. Tupper
*Assistant Examiner*—Melissa J. Koval
*Attorney, Agent, or Firm*—Birch, Stewart, Kolasch & Birch

[57] ABSTRACT

In a recording disc cartridge having a recording disc rotatably supported by a hub assembly in a disc case, the hub assembly is formed by a hub body and a reinforcing metal plate laid on one of the surfaces of the hub body so as to prevent thermal deformation of the recording disc due to deformation of the hub body.

8 Claims, 15 Drawing Figures

RECORDING DISC CARTRIDGE HAVING AN IMPROVED HUB ASSEMBLY

FIELD OF THE INVENTION

The present invention relates to a recording disc cartridge comprising a recording disc rotatably enclosed in a generally hard case body and a hub assembly secured to the recording disc.

BACKGROUND OF THE INVENTION

Figure 1:
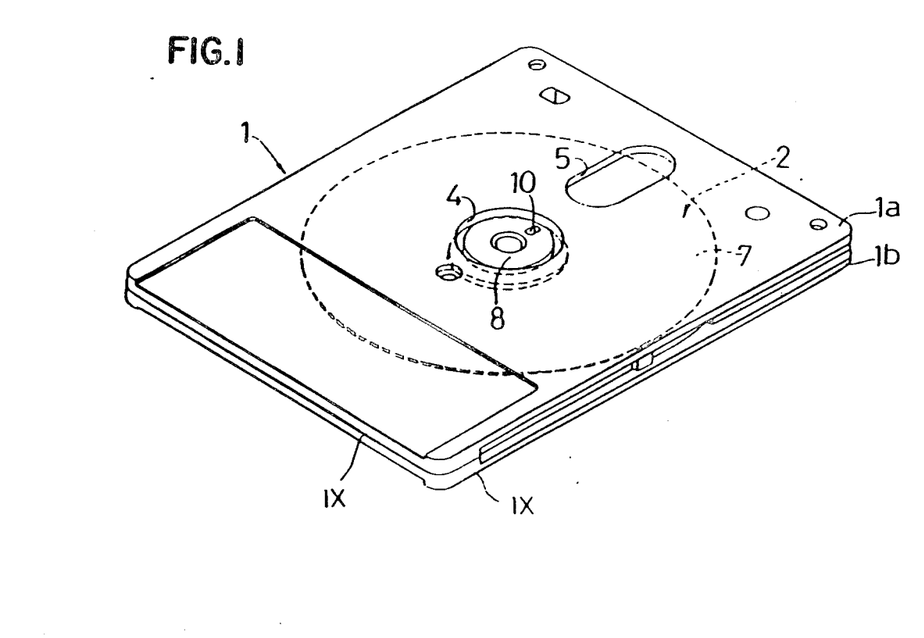
FIG. 1 is a perspective view of a recording disc cartridge to which the present invention is applied.
Figure 2:
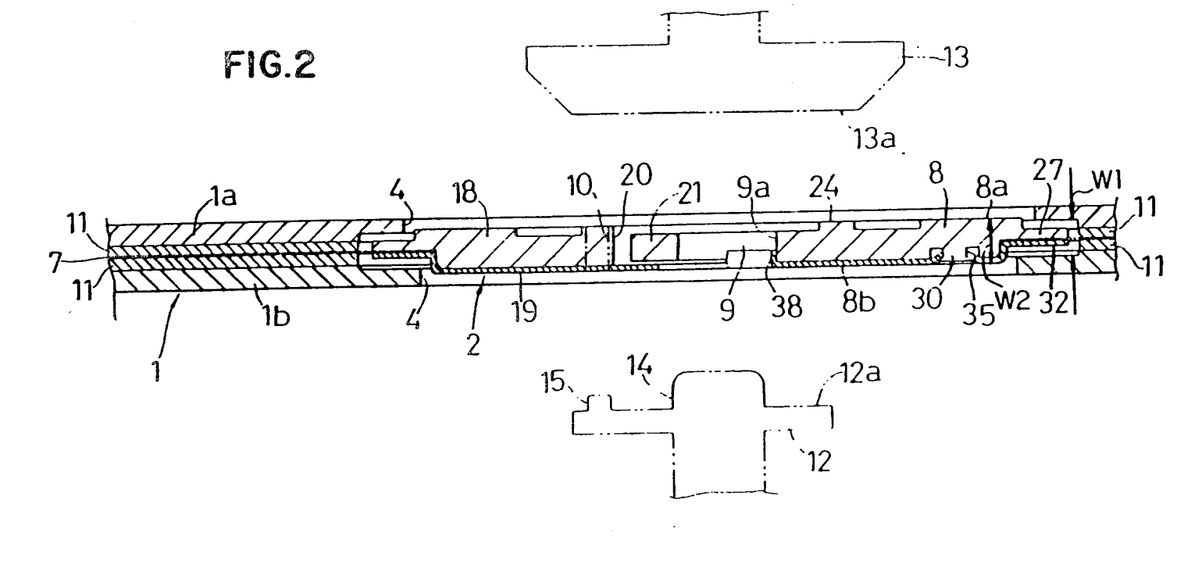
FIG. 2 is a partial side cross sectional view showing an essential portion of the recording disc cartridge shown in FIG. 1.

A recording disc of the above type is shown in FIGS. 1 and 2, wherein a recording disc 2, such as magnetic recording disc or optical recording disc, is rotatably enclosed in a hard disc case 1 having a generally rectangular shape. The recording disc 2 is composed of a recording medium 7 made of an annular magnetic or optical recording sheet and a hub 8 secured to the central portion of the recording medium 7 with the hub 8 disposed facing two drive shaft insertion holes 4 defined on both of a top half 1a and a bottom half 1b of the disc case 1. When the recording disc cartridge is mounted on a disc drive apparatus, the hub 8 is clamped by a hub supporting member 12 and a collet 13 each provided on the disc drive apparatus (FIG. 2) so as to come into contact with the top face 8a and the bottom face 8b of the hub 8, passed through the drive shaft insertion holes 4, whereby the recording disc 2 is rotated by rotation of the hub supporting member 12. In a recording disc cartridge of this type, the hub must have a predetermined thickness with an extremely high accuracy. Therefore, the hub is usually made of polyacetal or polyallylate having good moldability and stability in terms of dimension. In manufacturing, in order to assure an integral combination between the hub and the recording medium, the top half and the bottom half of the hub are separately molded, then the halves are opposed and combined together to clamp the peripheral portion of the central hole of the recording medium interposed between the two hub halves.

However, the recording disc cartridge of this type is generally expected to be used under a temperature range between 5° C. and 60° C. Under such circumstances, there may occur a problem of deformation of the hub due to the thermal expansion in the case where the hub is made of a plastic resin. The hub 8 is provided with a hole 9 for engagement of a spindle 14 projected from the hub supporting member 12 of the disc drive apparatus. When in use, each recording track on the recording medium traced by a recording head of the ecording/reproducing apparatus is defined by the accuracy of the center of the hole 9 and the center of the spindle 14 when the recording disc 2 is mounted on the disc drive. Therefore, the center of the hole 9 must coincide with the center of the spindle 14 to a high degree of accuracy. If the hub is thermally deformed, there may occur a problem of tracking error. In addition, in a case where the hub is made of a plastic resin material, the smaller the size of the hub, the lower the mechanical strength thereof.

Furthermore, if the recording medium 7 is a magnetic recording sheet having a base film made of a polyester resin with a magnetic layer coating, the magnetic recording sheet may be creased due to the difference in the amount of deformation of the hub and the recording sheet by the difference of the thermal expansion co-efficients between the hub and the magnetic recording sheet.

SUMMARY OF THE INVENTION

An essential object of the present invention is to assure centering of the hub of the recording disc cartridge relative to the center of a spindle of a disc drive apparatus to prevent tracking errors.

A further object of the present invention is to provide a hub assembly for use in a recording disc cartridge which prevents undesired deformation of the recording medium over a wide temperature range so that correct tracking is assured.

Another object of the present invention is to provide a hub for use in a recording disc cartridge having a sufficient mechanical strength even if the dimension of the recording disc cartridge is decreased.

Yet, a further object of the present invention is to provide a hub for use in a recording disc cartridge in which deformation of the recording medium can be effectively prevented.

DETAILED DESCRIPTION OF THE PREFERRED EMBODIMENTS

Before the description proceeds, it is noted that like parts are designated by like reference numerals throughout the attached drawings.

Referring to FIGS. 1 and 2, the disc case 1 of the recording disc cartridge is composed of the top half 1a and the bottom half 1b each made of a plastic resin, for example polystyrene resin, formed generally as a flat plate with the four peripheral sides surrounded by low vertical walls 1x. The top half 1a and the bottom half 1b are assembled together with the corresponding bottom face of the vertical walls of the top half 1a abutted to the top face of the vertical walls of the bottom half 1b so as to provide a flat space for accommodation of the hub 8 and the recording medium 7. The top half 1a and the bottom half 1b are securely connected by way of a supersonic welding method. On the central portion of both the top and bottom halves 1a and 1b of the disc case 1, there are defined the drive shaft insertion holes 4. A pair of elongated head insertion holes 5 are defined on the front portion of the top and bottom halves 1a and 1b. A shutter mechanism (not shown) is provided in the disc case 1 so as to shut the head insertion holes 5 when the disc cartridge is not used. When the disc cartridge is mounted on the recording/reproducing apparatus, the shutter can be moved to open the head insertion holes to allow entrance of the recording head of the recording-/reproducing apparatus.

The recording disc 2 is formed by the recording medium 7 in the form of a sheet having an annular shape and the hub 8 fixed on the central part of the recording medium 7 with the top end face and the bottom end face of the hub faced to the drive shaft insertion holes 4. The hub 8 is formed with the through hole 9 for insertion of the spindle 14 of the disc drive apparatus and with another through hole 10 defined outward of the spindle insertion hole 9 for engagement of the drive pin 15.

Cleaning liners 11 of nonwoven sheet material are laid on the inner faces of the top half 1a and the bottom half 1b so that when the recording disc is rotated upon mounting on the recording/reproducing apparatus, the surfaces of the recording medium 7 can be cleaned by sliding contact with the cleaning liners 11.

As shown in FIG. 2, in the disc drive apparatus, the hub supporting member 12 and the collet 13 are opposedly disposed and the spindle 14 is projected from the center of the hub supporting member 12 with the drive pin 15 projected outward from the member 12 lateral to the spindle 14. Upon mounting of the disc cartridge on the disc drive apparatus, the top face 8a and the bottom face 8b of the hub 8 can be clamped by the supporting face 12a of the hub supporting member 12 and the top face 13a of the collet 13 with the spindle 14 and the drive pin 15 inserted in the spindle insertion hole 9 and the drive pin insertion hole 10 respectively, whereby the recording disc 2 can be rotated by rotation of the spindle 14 and the drive pin 15 whereby the collet 13 is also rotated.

One of the specific features of the disc cartridge according to the present invention is that the hub 8 is formed of a hub body 18, made of plastic resin material, and a reinforcing plate 19, made of a metal, disposed on the bottom of the hub body 18.

Figure 3:
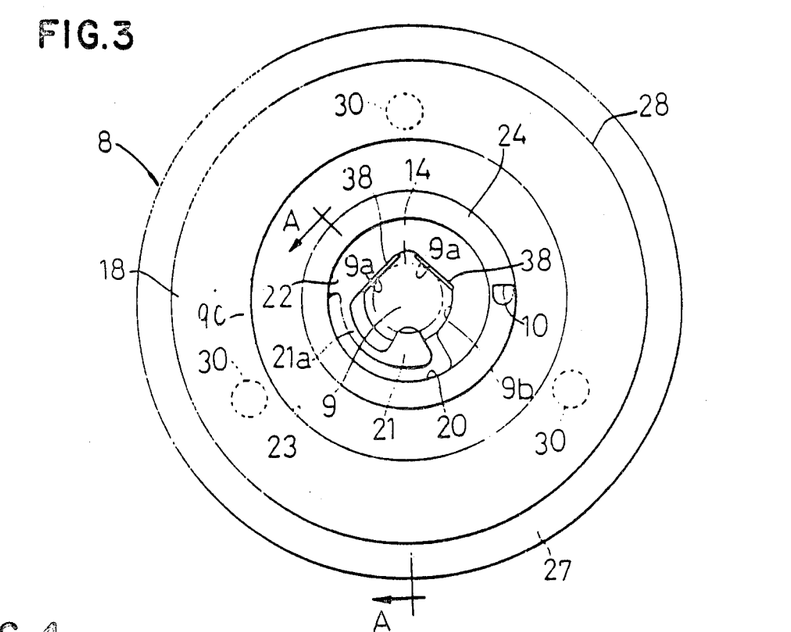
FIG. 3 is a top plan view of a hub used in the recording disc cartridge shown in FIG. 1.
Figure 4:
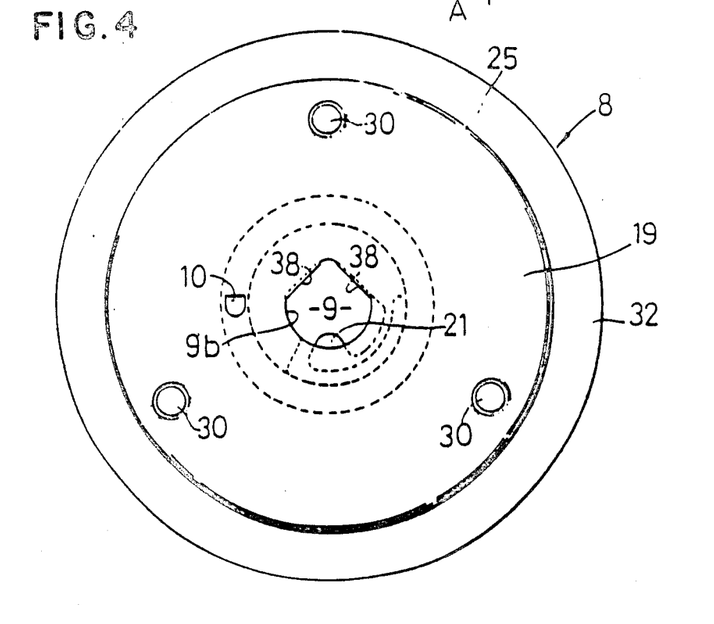
FIG. 4 is a bottom plan view of a hub used in the recording disc cartridge shown in FIG. 1.
Figure 5:
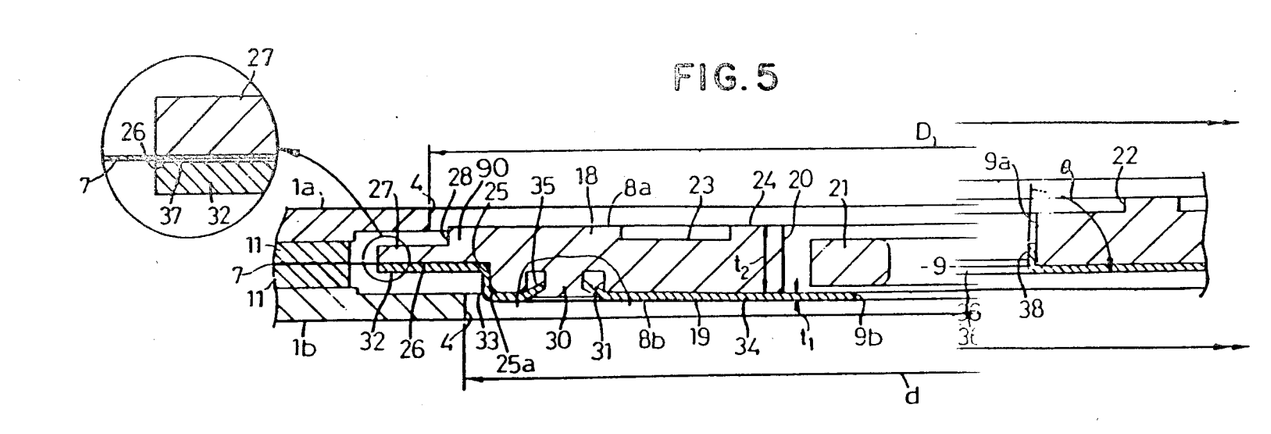
FIG. 5 is an enlarged cross sectional view taken along the lines A—A in FIG. 3.

Referring to FIGS. 3 to 5, the hub body 18 is made of a plastic resin material having good moldability such as polyacetal or polyallylate and the spindle insertion hole 9 on the central portion of the hub body 18 is partly defined by a through hole 20 of a generally reversed C character shape in plan view. The through hole 20 is partly defined by a pair of vertical flat walls 9a extending perpendicularly to each other. An arm 21a is projected from the wall 9c defining a part of the through hole 9 so as to extend in a circumferential direction in a canti-lever manner with the free end of the arm 21a formed as an engaging clip 21 for exerting the spindle 14 entered in the through hole 9 towards the walls 9a and 9b, thereby regulating the correct position between the hub 8 and the spindle 14. On the top face of the hub 8, an annular vertical wall 22 is formed coaxially with the center of the hub 8 and furthermore, an annular slot 23 is defined coaxially and outwardly of the annular vertical wall 22 so as to form an annular rib 24 between the vertical wall 22 and the slot 23 for engagement with the collet 13. A drive pin insertion hole 10 is formed in one part of the rib 24. The rib 24 may be divided into trisected three parts discontinued in the circumferential direction. The hub body 18 is stepped at 25 on the lower half and outer peripheral portion of the hub body 18 to provide a flat surface 26 for clamping the recording medium 7 in association with the reinforcing plate 19 attached thereto. Also, the hub body 18 is stepped at 28 to form an annular flange 27 on the outer periphery of the hub body 18. By forming the stepped portion 28 outward of the stepped portion 25, the hub body 18 can be reinforced by the thick portion 90, the lower face of which acts in clamping the inner peripheral edge portion of the recording medium 7. In connection with this arrangement, the diameter D of the drive shaft insertion hole 4 defined on the top half 1a is larger than the diameter d of the drive shaft insertion hole defined on the lower half 1b of the disc case. It is noted that the outer corner of the stepped portion 25 is chamfered, as shown by 25a, so that the metal reinforcing plate 19 can be easily and completely fitted to the lower face of the hub body 18. The chamfered portion 25a may be formed by a round shape. In order to secure the reinforcing plate 19 covering the lower surface of the case body, in this embodiment, three projections 30 are formed inside the recesses 31 defined on the lower face of the hub body 18 in trisected positions and holes defined on the reinforcing plate 19 are fitted to the projections 30, which is coaked by a super- sonic welding, thus the reinforcing plate 19 can be secured to the hub body 18.

As the reinforcing plate 19, a metal sheet is used having a thermal expansion coefficient equal to or smaller than the thermal expansion co-efficient of the recording medium 7. In practice, magnetic stainless steel, such as SUS 430 (Japan Industrial Standard), or normal stainless steel sheet are preferred. The reinforcing plate 19 comprises a flat flange portion 32, a vertical cylidrical wall 33 stepped downwardly from the flange 32 and a generally flat bottom wall 34 connecting to the foot portion of the cylindrical wall 33. As a whole, the reinforcing plate 19 is formed in the form of a saucer having a projected portion and a recessed portion corresponding to the projected portion. Three coaking bosses 35, having a through hole fitted to the projection 30, are formed in the bottom wall 34 at the trisected positions in terms of the circumferential direction. A hole 36 is defined on the center of the bottom wall 34 of the reinforcing plate 19 so as to communicate with the spindle insertion hole 9. Therefore, the spindle insertion hole 9 is of an abnormal shape such that the spindle insertion hole 9 is formed by the flat walls 9a intersecting perpendicularly with the through hole 20 and the guide edges of the semi-circular shape which expands about 180°. The reinforcing plate 19 is bent upward at the guide edge portion 9b of the hole 36 to form a pair of bent clips 38 which are adapted to contact with the flat walls 9a. By this arrangement the bent clips 38 act to contact the spindle 14. The bent angle $\theta$ of the bent clips 38 is slightly smaller than 90°, preferably 45° to 89°. By setting the angle, as described above, the spindle can be prevented from engagement with a flash formed on the free edge of the bent clips 38, causing the spindle 14 to contact the bent portions of the bent clips 38 which are bent in a round form. By forming each of the bent clips 38 separatedly, the bending work can be accomplished easily. However, the bent clips 38 can be made integrally. The bent clips 38 may be omitted so that the inner peripheral face of the reinforcing plate 19 defining the hole 36 can be slidably engaged with the spindle 14. The guide edge 9b of the spindle insertion hole 9 also acts as a protection wall of the engaging clip 21 provided on the hub body 18. Namely, when the engaging clip 21 is pressed from above, the guide edge 9b receives the engaging clip 21 limiting the motion of the engaging clip, on the other hand, when an undesired foreign substance comes in the hole 9, the guide edge 9b acts to prevent the motion of the foreign substance, thereby preventing damage of the engaging clip 21.

The thickness W2 of the main portion of the hub 8 is greater than the width of the gap W1 between the inner surfaces of the top half 1a and bottom half 1b.

In assembling the hub 8, the hub body 18 is reversed from the state shown in the drawings and the central hole of the recording medium 7 is fitted to the stepped wall 25, locating the recording medium 7 on the sheet receiving face 26. Since there is formed the chamfered portion 25a on the corner of the stepped wall 25, the recording medium 7 can be easily fitted with the stepped wall 25. Preferably the peripheral edge portion of the central hole of the recording medium 7 is preliminarily fixed, slightly adhered on the sheet receiving face 26 by a small amount of the adhering material. Subsequently, the reinforcing plate 19 covers the bottom face of the hub body 18, fitting the cylindrical wall 33 to the stepped wall 25 with the coaking boss 35 fitted with the projections 30 and in turn the projections 30 are coaked by the ultrasonic welding method, whereby the reinforcing plate 19 can be integrally fitted onto the bottom face of the hub body 18. During the ultrasonic welding, the melt portion of the projections 30 can be collected in the recesses 31, filling the peripheral portion of the coaking bosses 35, thereby the lower face of the projection 30 thus coaked forming a generally flat face being flush with or sunk from the lower face of the reinforcing plate 19.

In the process of assembling the hub as described above, the recording medium 7 is strongly attached to the flange 32 of the reinforcing plate 19 by the adhering layer 37. The adhering layer 37 may be formed on either the reinforcing plate 19 or the recording medium 7. It is essential to fit the recording medium 7 integrally to the flange 32 of the reinforcing plate 19.

The thickness t1 of the reinforcing plate 19 is ¼ to 1/50, preferably ¼ to 1/20 of the thickness t2 of the hub body 18. In practice, the thickness t1 of the reinforcing plate 19 is 0.3 mm and the thickness t2 of the hub body 18 is 2.1 mm. The thickness t1 of the reinforcing plate may be sufficient if it is thinner than 1 mm.

Fitting the reinforcing plate to the hub body prevents deformation of the hub over the temperature range of 5° C. to 60° C. by the reinforcing plate, even if the hub body is made of easily deformable material by thermal expansion although the material has good moldability.

The reinforcing plate 19 and the recording medium 7 have a generally similar thermal expansion co-efficient and the thermal expansion co-efficient of the hub body 18 is larger than those of the reinforcing plate and recording medium. If the hub body 18 is deformed greater than the recording medium 7 when the hub is subjected to a thermal change, since the hub body 18 is reinforced by the reinforcing plate 19, which is fitted thereto by coaking with the cylindrical wall 33 of the reinforcing plate 19 engaged with the stepped wall 25 of the hub body 18, the reinforcing plate 19 prevents the thermal deformation of the hub body 18. Since the recording medium 7 is merely preliminarily fitted to the hub body 18 and strongly fitted to the reinforcing plate 19, the recording medium 7 is scarcely affected by deformation of the hub body 18. In particular, a part of the inner surface of the spindle insertion hole 9 is covered by the bent clips 38 of the reinforcing plate 19, thus the engaging acuracy between the spindle 14 and the hub 8 is assured.

It is not essential to adhere the peripheral portion of the central hole of the recording medium 7 on the upper side of the flange 27 of the hub body 18 and the flange 32 of the reinforcing plate 19. The recording medium 7 may be adhered to the flange 27 of the hub body 18. In a case where the recording medium 7 is clamped by the hub body 18 and the reinforcing plate 19, it is preferred to fit the recording medium 7 to the outer periphery of the lower portion of the flange 32 of the reinforcing plate 19 in view of avoiding the thermal deformation of the recording medium 7.

In a case where the reinforcing plate 19 is made of the magnetic stainless sheet, the disc drive of the magnetic catch system to catch the disc cartridge can be used.

Figure 6:
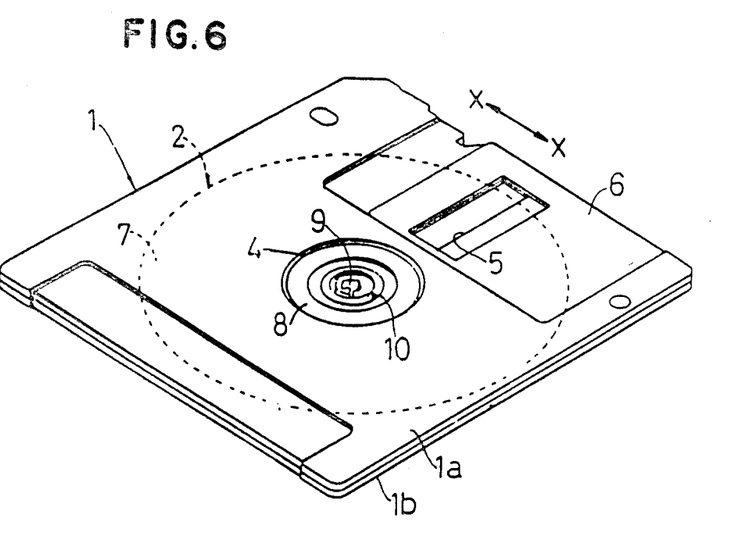
FIG. 6 is a perspective view of a second embodiment of the recording disc cartridge according to the present invention.
Figure 7:
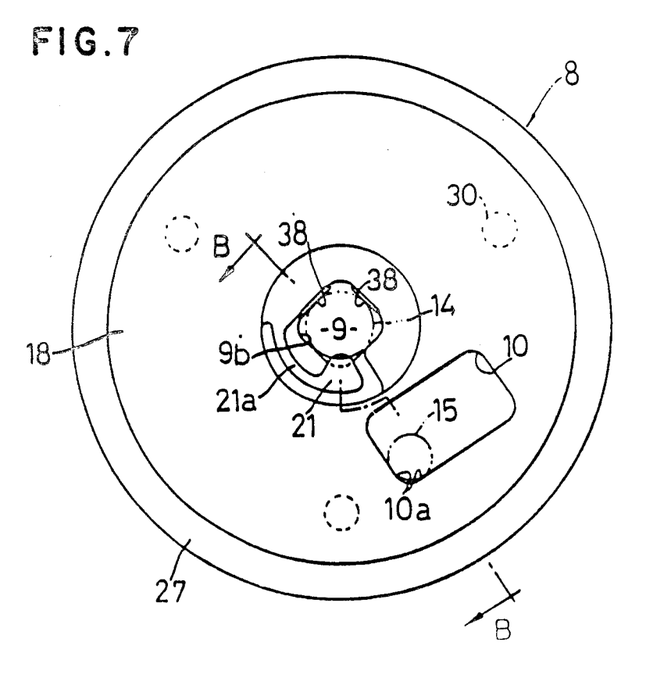
FIG. 7 is a top plan view of the hub used in the recording disc cartridge shown in FIG. 6.
Figure 8:
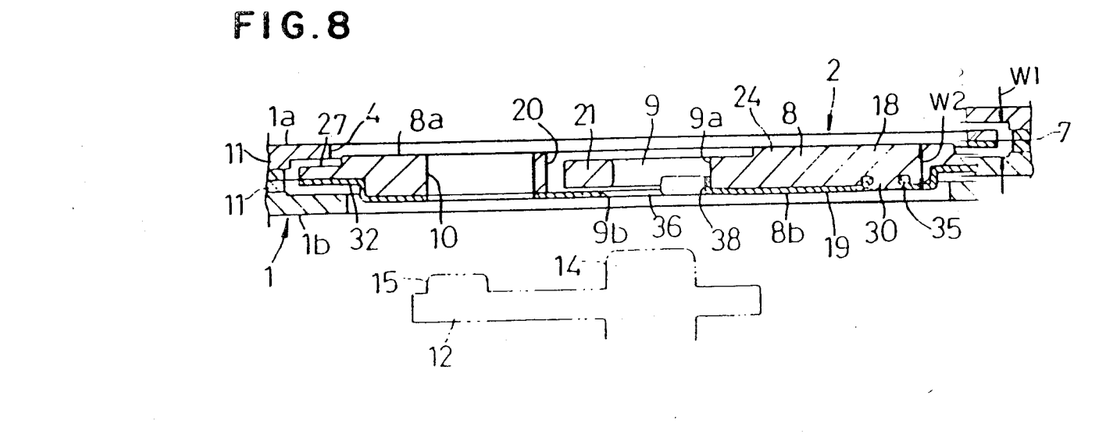
FIG. 8 is an enlarged cross sectional view taken along the lnes B—B in FIG. 7.

Referring to FIGS. 6 to 8, there are shown a second embodiment of the recording disc cartridge according to the present invention, wherein shutters 6 for opening and closing the head insertion holes 5 are adapted to be moved in a widthwise direction X of the disc case 1 which is generally formed in a square shape. In this embodiment, the drive pin insertion hole 10 differs from that of the first embodiment. In the second embodiment, the drive pin insertion hole 10 has a generally rectangular shape in plan view with the circumferential direction thereof elongated so as to facilitate reception of the drive pin 15. Upon mounting of the recording disc cartridge of the second embodiment, the drive pin 15 of the disc drive abuts onto the corner 10a of the drive pin insertion hole 10 pressing the spindle 14 to the bent clips 38 forming a part of the inner face of the spindle insertion hole 9, thereby causing the center of the spindle 14 to accurately coincide with the center of the hub 8 without play. The upper surface 8a, including the collet receiving face 24 of the hub body 18, is a flat face.

Figure 9:
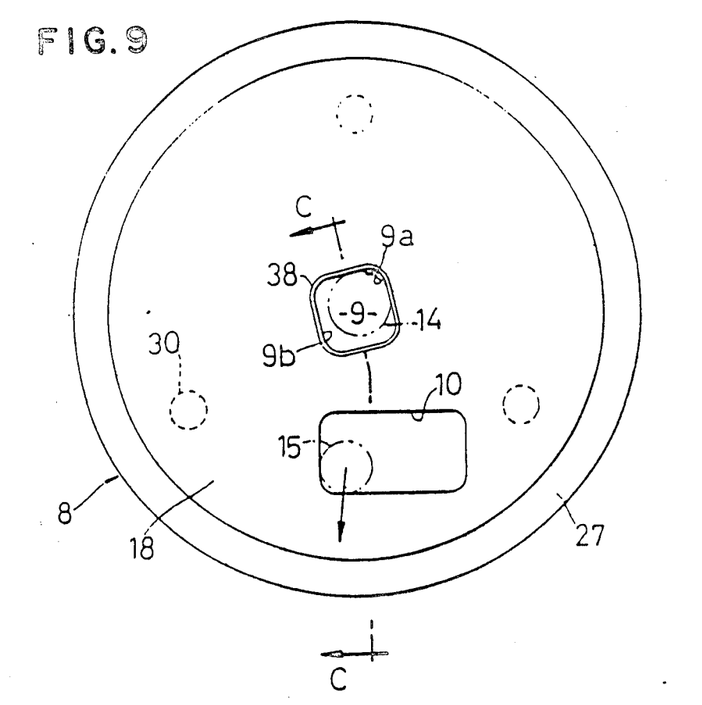
FIG. 9 is a top plan view of a hub of the third embodiment of the present invention.
Figure 10:
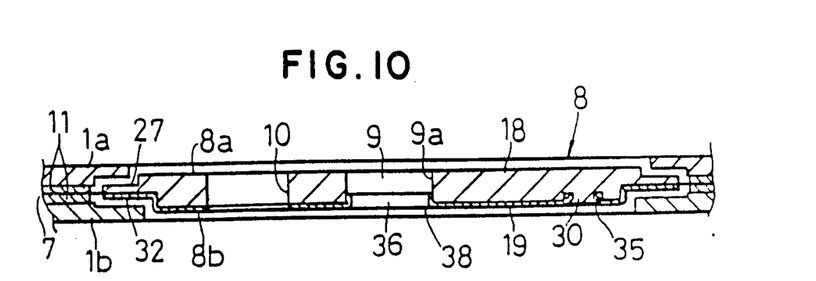
FIG. 10 is an enlarged cross sectional view taken along the lines C—C in FIG. 10.

Referring to FIGS. 9 and 10 showing a third embodiment of the present invention, the spindle insertion hole 9 has a rectangular shape in plan view and the central portion of the reinforcing plate 19 is bent to form the bent clips 38 which contact securely to the inner faces of the lower portion of the spindle insertion hole 9. In the third embodiment, the engaging clip 21 is omitted. The drive pin insertion hole 10 has an elongated rectangular shape in a similar manner as in the second embodiment. In place of the engaging pin 21, the drive pin 15 of the hub supporting member 12 is exerted in an outward and radius direction, as shown by an arrow relative to the spindle 14 by a resilient member, so as to prevent displacement of the hub 8.

Figure 11:
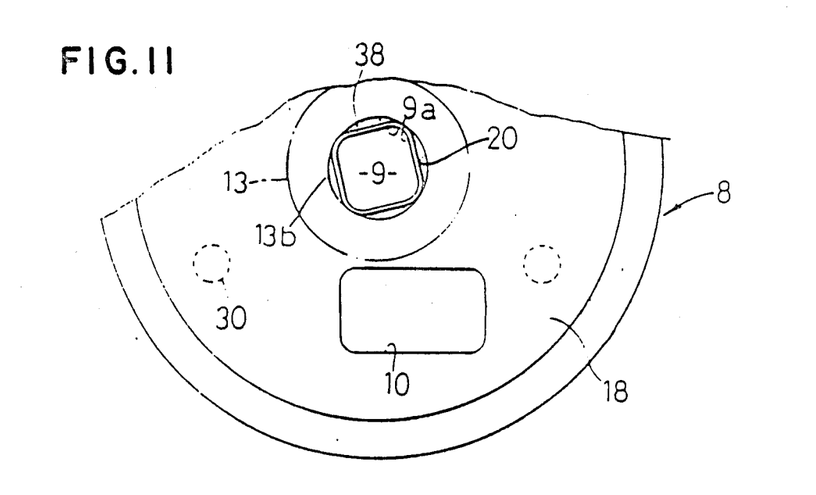
FIG. 11 is a top plan view showing a modification of the hub shown in FIG. 9.

Referring to FIG. 11, the through hole 20 is formed in a round shape, and each corner defined by the bent chips 38 in the through holes 36 is situated to be inscribed to the through hole 20. The shaft portion 13b projected from the top end 13a of the collet 13 can be introduced into the upper portion of the hole 20, as shown by phantom lines. It is not necessary to closely fit the bent clips 38 with the inner face of the hole 20.

Figure 12:
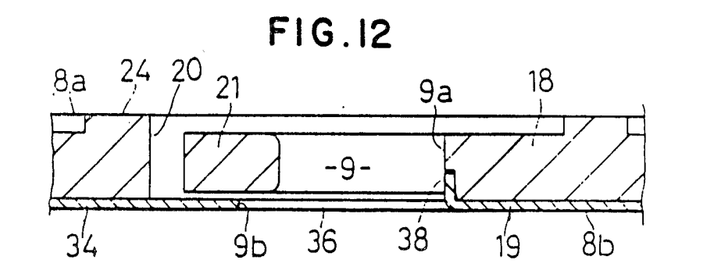
FIG. 12 is a cross sectional view showing an essential portion to the hub shown in FIG. 1 for explanation of the peripheral portion of the hole for receiving the spindle.
Figure 13:
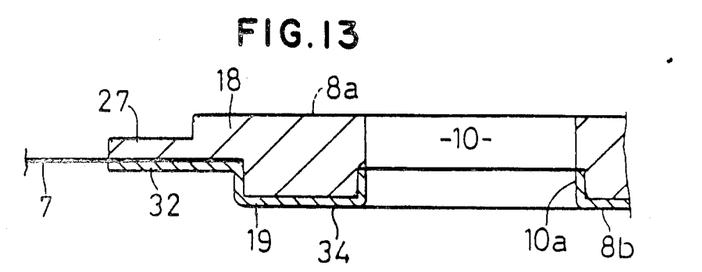
FIG. 13 is a cross sectional view showing an essential portion of the arrangement for engagement of the drive shaft.

FIG. 12 shows a modification of the first to third embodiments, wherein the bent clips 38 are flush with the corresponding inner faces of the hole 20, forming the vertical walls. In the example shown in FIG. 13, in the drive shaft insertion hole 10, the engaging wall 10a is raised from the bottom wall 34 with the engaging wall 10a to be flush with the vertical wall of the drive pin insertion hole 10.

Figures 14, 15:
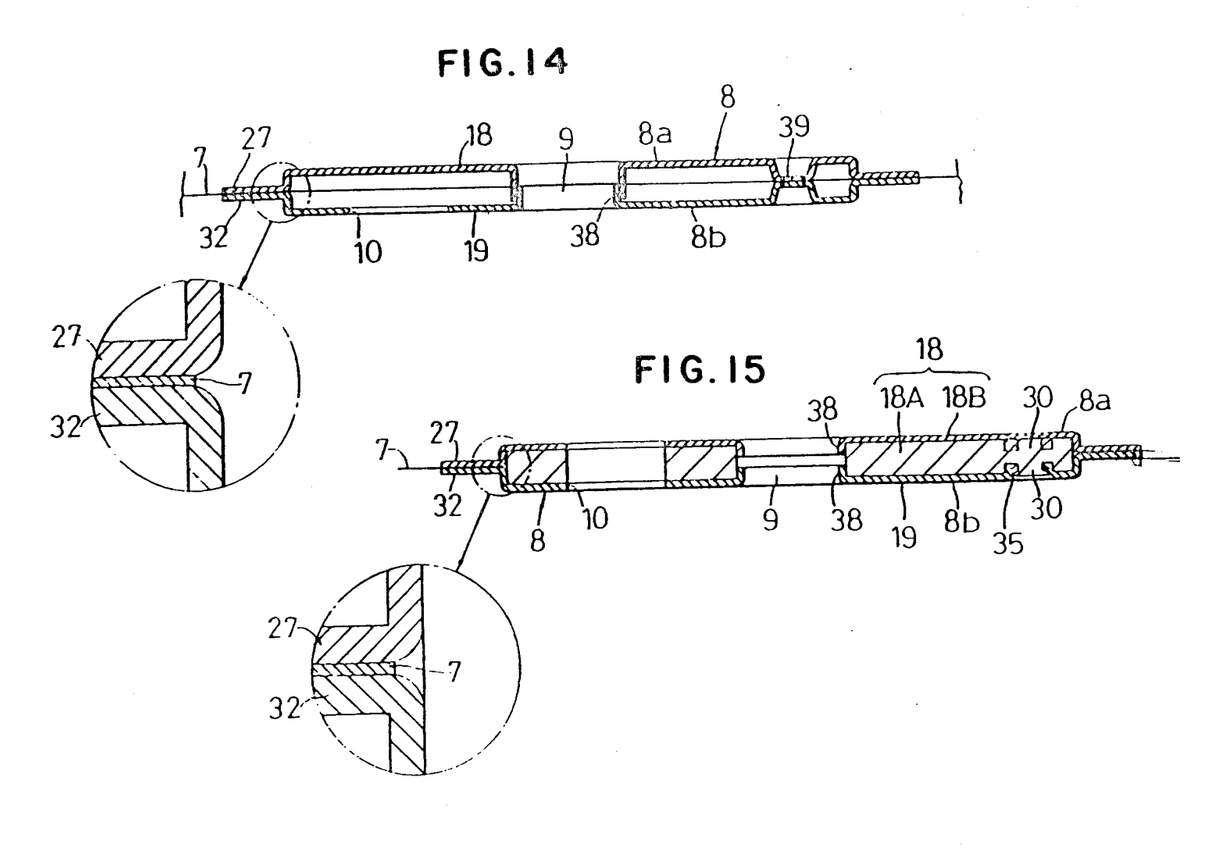
FIG. 14 is a cross sectional view showing a fourth embodiment of the recording disc cartridge of the present invention.
FIG. 15 is a cross sectional view showing a fifth embodiment of the recording disc cartridge of the present invention.

FIG. 14 shows a fourth embodiment of the present invention, wherein the hub body 18 is also formed by a metal plate as well as the reinforcing plate 19. The hub body 18 and the reinforcing plate 19 are integrally combined by welding, adhering or coaking at a plurality of positions divided in the circumferential direction. The recording medium 7 is clamped by the hub body 18 and the reinforcing plate 19.

FIG. 15 shows a fifth embodiment of the present invention, wherein the hub 8 is formed of a combination of a hub core 18A made of a plastic resin such as polyacetal, and a cover plate 18B of the material and the shape almost similar to those of the reinforcing plate 19. The reinforcing plate 19 and the cover plate 18B are integrated with the core body 18A on the upper face and the lower face of the core body 18A by coaking the projections 30. The shape of the upper portion of the hub 18 and the shape of the lower portion of the hub 18 are symmetrical so that the recording disc cartridge can be used in both faces of the recording medium.

Various modifications can be considered to those skilled in the art from the embodiments described above, for example, the hub body can be made of two parts divided into the top portion and the bottom portion and they are combined together clamping the recording medium therebetween with the reinforcing plate attached on one of the faces of the top portion and the bottom portion.

In place of the flange 32 of the reinforcing plate 19 shown in FIG. 5, an annular ring may be fitted to the cylindrical wall 33 with the recording medium clamped by this ring and the flange 27 of the hub body 18.

In place of supporting over all the bottom face 34 of the reinforcing plate 19 by the hub receiving member 12a of the hub supporting member 12, it is desirable to support the hub by only the outer peripheral portion of the bottom wall 34 of the hub. In other words, the bottom wall 34 may not be a flat face.

Furthermore, the drive pin insertion hole 10 may be a recess which is not a through hole but only engageable with the drive pin 15. Also the disc may be a two face recordable type.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A recording disc cartridge comprising a disc case having a top section and a bottom section combined together, drive shaft insertion holes defined through said top section and said bottom section, a recording disc rotatably mounted in said disc case, said recording disc including a recording medium and a hub assembly disposed about said drive shaft insertion holes, said hub assembly supporting said recording medium at a central portion of said recording medium, a spindle insertion hole defined at a central portion of said hub assembly and a drive pin engaging means defined at a position apart radially outward from said spindle insertion hole, characterized in that said hub assembly comprises a hub body having an upper face and a lower face with a reinforcing plate formed on said lower face of said hub body, said recording medium having an inner portion secured to said reinforcing plate and said spindle insertion hole has an inner face, a part thereof being formed by a part of said reinforcing plate, said hub body having an outer peripheral stepped portion at least on the upper face of said hub body providing an annular flange projecting outward from said hub body, in contact with an inner peripheral edge of said recording medium, so as to cover and protect said inner peripheral edge of said recording medium.

2. The recording disc cartridge according to claim 1, wherein said hub body is made of a plastic resin material and said reinforcing plate is a metal plate.

3. The recording disc cartridge according to claim 2, wherein said reinforcing plate has generally a saucer shape with a lip portion and sunken portion, a central projecting portion of said reinforcing plate disposed so as to be engageable in the drive shaft insertion hole.

4. The recording disc cartridge according to claim 3, wherein an inner peripheral portion of said recording medium is sandwiched between said lip portion at an outer peripheral edge of said reinforcing plate and said stepped annular flange of said hub body.

5. The recording disc cartridge according to claim 2, wherein said hub assembly further comprises a resilient means for resiliently exerting a spindle inserted through said spindle insertion hole toward a circumferential face of said spindle insertion hole.

6. The recording disc cartridge according to claim 5, wherein said resilient means is formed as an integral part of said hub body.

7. The recording disc cartridge according to claim 2, wherein said hub body is provided with a rib means projecting from a peripheral edge of said upper face of said hub body around said drive shaft insertion hole, said rib means having a drive pin insertion hole formed in one part of said rib.

8. The recording disc cartridge according to claim 1, wherein thickness of the main portion of the hub assembly is greater than a gap between the inner surfaces of the top section and the bottom section of said disc case so that said hub assembly can be rotatably engaged in the drive shaft insertion hole of said disc case.

* * * * *